(12) United States Patent
Honda

(10) Patent No.: US 7,515,193 B2
(45) Date of Patent: Apr. 7, 2009

(54) PORTABLE COMMUNICATION TERMINAL SWITCHABLY DISPLAYING PICTURES BASED ON A PLURALITY OF VIDEO SIGNAL SOURCES

(75) Inventor: Masanori Honda, Higashihiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 747 days.

(21) Appl. No.: 11/012,619

(22) Filed: Dec. 16, 2004

(65) Prior Publication Data

US 2005/0134718 A1 Jun. 23, 2005

(30) Foreign Application Priority Data

Dec. 17, 2003 (JP) ............................. 2003-419681

(51) Int. Cl.
*H04N 5/222* (2006.01)
*H04N 5/225* (2006.01)
*H04B 1/38* (2006.01)
*H04B 1/44* (2006.01)
*H04M 1/00* (2006.01)

(52) U.S. Cl. ........................... 348/333.05; 348/333.06; 348/333.12; 348/373; 348/552; 455/73; 455/78; 455/556.1; 455/566

(58) Field of Classification Search ............ 348/333.06, 348/333.05
See application file for complete search history.

(56) References Cited

U.S. PATENT DOCUMENTS

| | | | |
|---|---|---|---|
| 5,640,612 A | 6/1997 | Owashi | |
| 6,957,083 B2 * | 10/2005 | Ikeda et al. | 455/556.1 |
| 7,084,919 B2 * | 8/2006 | Shibata et al. | 348/333.06 |
| 7,126,626 B2 * | 10/2006 | Sawahara et al. | 348/14.02 |
| 7,139,594 B2 * | 11/2006 | Nagatomo | 455/566 |

(Continued)

FOREIGN PATENT DOCUMENTS

DE    100 59 500 A1    8/2001

(Continued)

OTHER PUBLICATIONS

Narayanaswami, Chandra, "Expanding the digital camera's reach," Dec. 2004, Computer vol. 37, Issue 12, pp. 65-73.*

(Continued)

*Primary Examiner*—Ngoc-Yen T Vu
*Assistant Examiner*—Michael Osinski
(74) *Attorney, Agent, or Firm*—Birch, Stewart, Kolasch & Birch, LLP

(57) ABSTRACT

A cellular phone having a plurality of cameras and being able to switch display of a picture without interrupting display for the camera is provided. Processes executed by a control unit of the cellular phone include the steps of measuring a holddown time when holddown of a button is detected; sending the video signal sent from the camera corresponding to a numeric button to a main monitor when a first function button is held down for a holddown time shorter than a predetermined time and the numeric button is held down; and sending the video signal sent from the camera set as a next source to the main monitor when the numeric button is not held down. The processes further includes the step of sending the video signal sent from a main camera to main monitor when the holddown time is longer than the predetermined time.

13 Claims, 13 Drawing Sheets

U.S. PATENT DOCUMENTS

| | | |
|---|---|---|
| 2001/0004269 A1 | 6/2001 | Shibata et al. |
| 2004/0072589 A1* | 4/2004 | Hamamura et al. ........ 455/550.1 |
| 2005/0156879 A1* | 7/2005 | Honda et al. ................. 345/156 |
| 2005/0164745 A1* | 7/2005 | Oe et al. ...................... 455/566 |

FOREIGN PATENT DOCUMENTS

| | | | |
|---|---|---|---|
| EP | 1718037 | * | 6/2002 |
| EP | 1420574 | * | 10/2003 |
| EP | 1 359 528 A2 | | 11/2003 |
| EP | 1 359 528 A3 | | 11/2003 |
| JP | 6-197335 A | | 7/1994 |
| JP | 6-311509 A | | 11/1994 |
| JP | 9-322043 A | | 12/1997 |
| JP | 10-65780 A | | 3/1998 |
| JP | 10-200873 A | | 7/1998 |
| JP | 2001-169166 A | | 6/2001 |
| JP | 2002-51315 A | | 2/2002 |
| JP | 2003-158727 A | | 5/2003 |
| JP | 2003-189168 A | | 7/2003 |
| JP | 2003-274376 A | | 9/2003 |
| JP | 2003-283618 A | | 10/2003 |
| JP | 2003-283650 A | | 10/2003 |

OTHER PUBLICATIONS

NTT Docomo Catalogue "MOVA P504iS", p. 130.

* cited by examiner

FIG.1A
FIG.1B
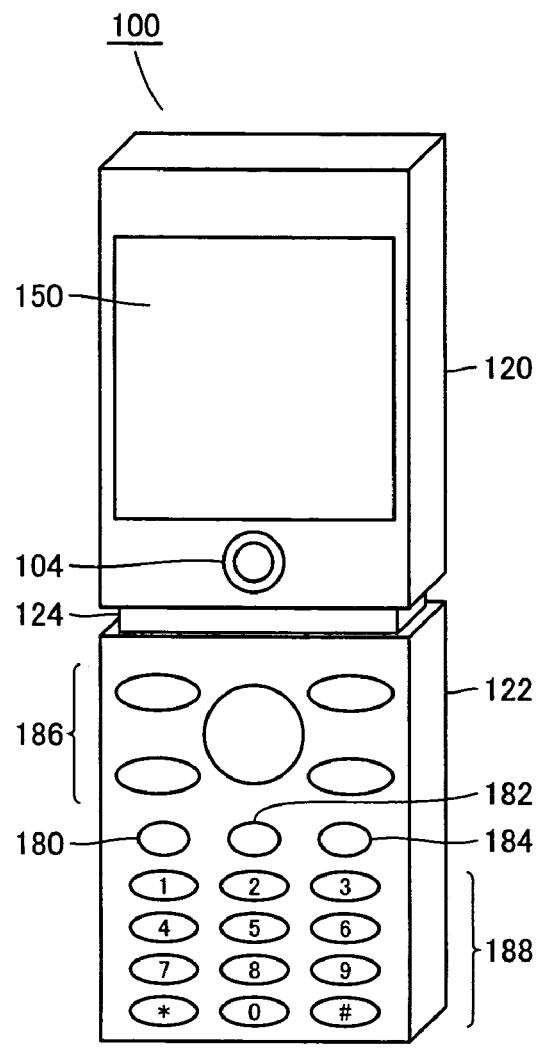
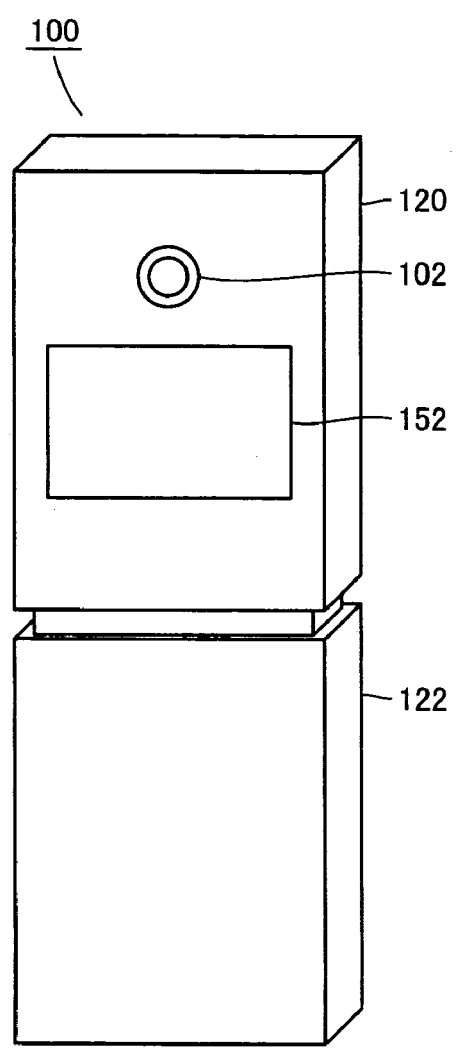

FIG.5

| | MODE | FUNCTION BUTTON | HOLDDOWN TIME | OTHER BUTTON INPUT | SET FUNCTION |
|---|---|---|---|---|---|
| R550 | CAMERA MODE | 1ST FUNCTION BUTTON | SHORT | NO | CHANGE ACTIVE CAMERA ACCORDING TO SET ORDER |
| R560 | CAMERA MODE | 1ST FUNCTION BUTTON | SHORT | "1" | SEND VIDEO SIGNAL OF 1ST SUB-CAMERA TO MAIN MONITOR |
| R570 | CAMERA MODE | 1ST FUNCTION BUTTON | SHORT | "2" | SEND VIDEO SIGNAL OF 2ND SUB-CAMERA TO MAIN MONITOR |
| R580 | CAMERA MODE | 1ST FUNCTION BUTTON | SHORT | "3" | SEND VIDEO SIGNAL OF 3RD SUB-CAMERA TO MAIN MONITOR |
| R590 | CAMERA MODE | 1ST FUNCTION BUTTON | LONG | NO | SEND VIDEO SIGNAL OF MAIN CAMERA TO MAIN MONITOR |

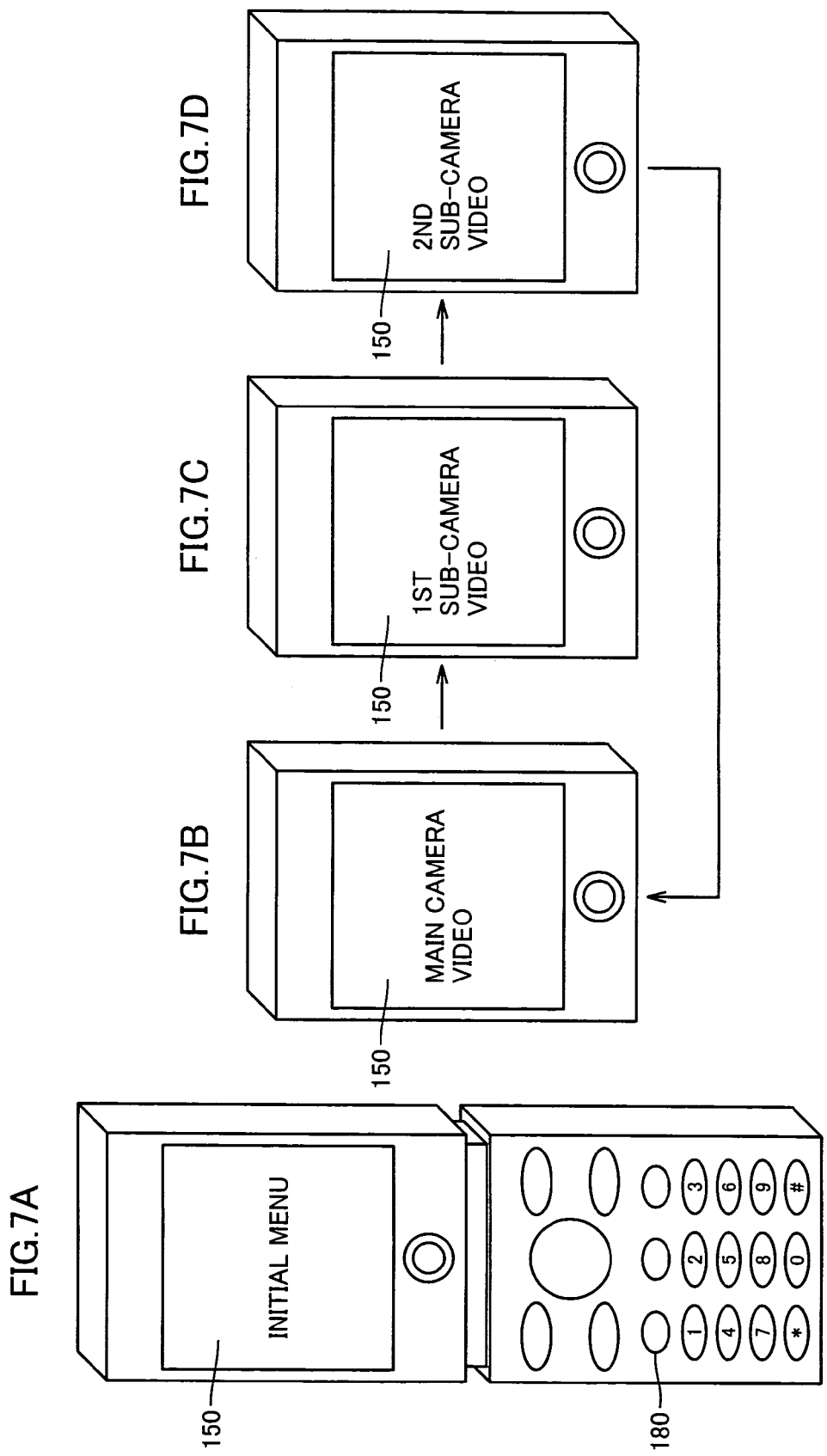

FIG.8

| | MODE D802 | FUNCTION BUTTON D804 | HOLDDOWN TIME D806 | SET FUNCTION D808 |
|---|---|---|---|---|
| R850 | CAMERA/ VIDEOPHONE MODE | 2ND FUNCTION BUTTON | SHORT | SEND VIDEO SIGNAL OF SUB-CAMERA TO MAIN MONITOR |
| R860 | CAMERA/ VIDEOPHONE MODE | 2ND FUNCTION BUTTON | LONG | SEND VIDEO SIGNAL OF VIDEOPHONE TO MAIN MONITOR |
| | CAMERA/ VIDEOPHONE MODE | 3RD FUNCTION BUTTON | SHORT | CHANGE POSITION OF SUB-DISPLAY REGION IN MAIN MONITOR BASED ON SET DATA |
| | CAMERA/ VIDEOPHONE MODE | 3RD FUNCTION BUTTON | LONG | SWITCH SOURCES OF VIDEO SIGNALS SENT TO MAIN AND SUB-DISPLAY REGIONS ON MAIN MONITOR |

130

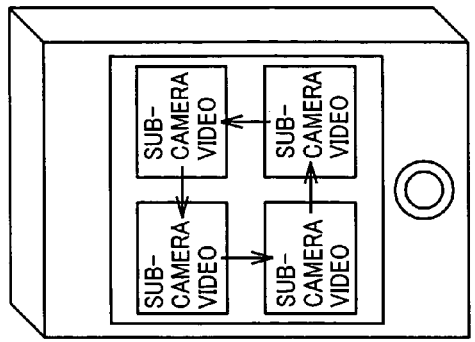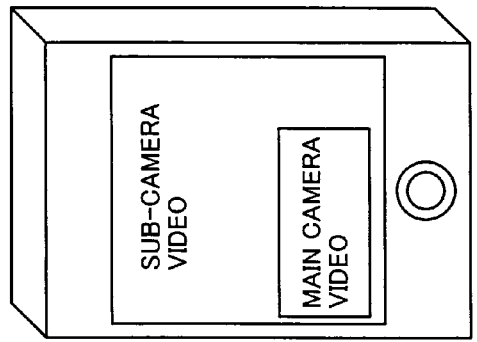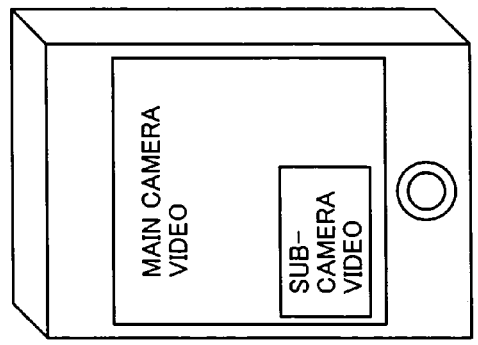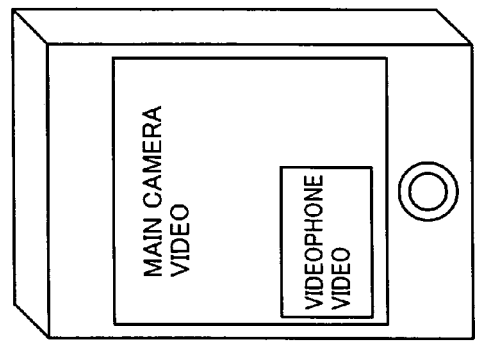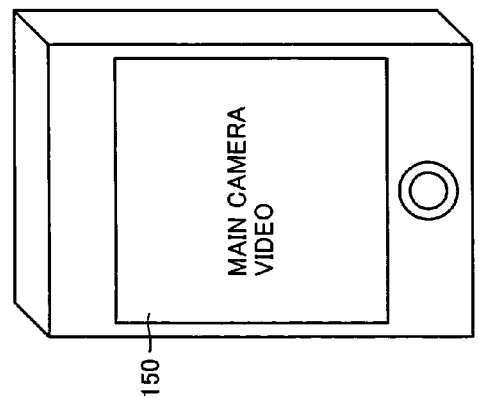

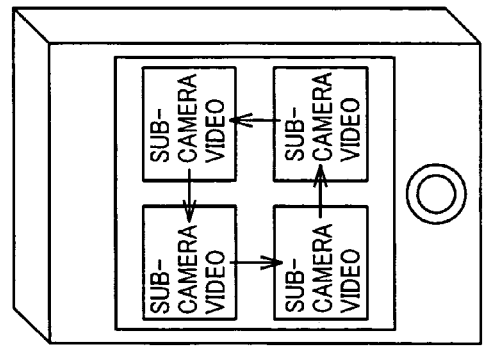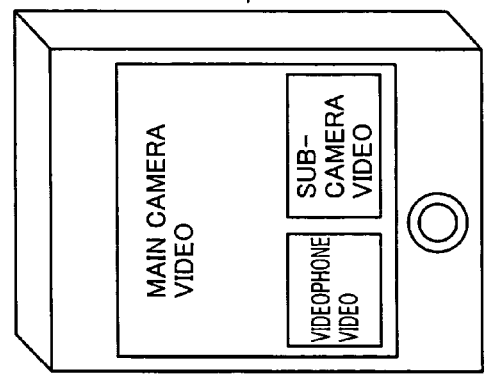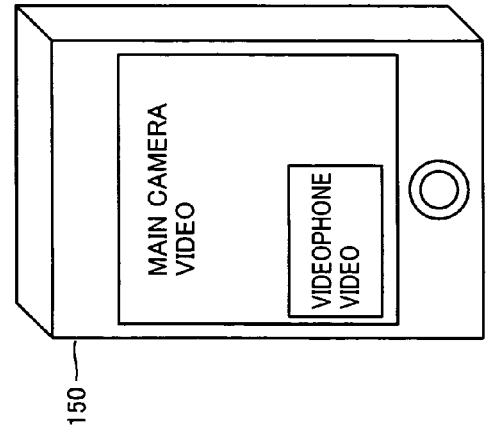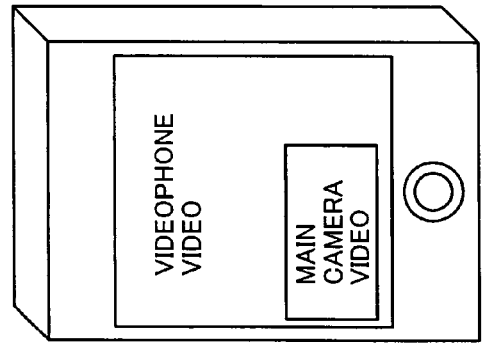

PORTABLE COMMUNICATION TERMINAL SWITCHABLY DISPLAYING PICTURES BASED ON A PLURALITY OF VIDEO SIGNAL SOURCES

This nonprovisional application is based on Japanese Patent Laid-Open (Kokai) No. 2005-184230 (now issued as Japanese Patent No. 4,118,231) filed with the Japan Patent Office on Dec. 17, 2003, the entire contents of which is hereby incorporated by reference.

BACKGROUND OF THE INVENTION

1. Field of the Invention

The present invention relates to a portable communication terminal, and particularly to a portable communication terminal having a plurality of video signal sources.

2. Description of the Background Art

In recent years, portable communication terminals having image-taking means such as a camera-equipped cellular phone have been widely used. Further, such a portable communication terminal has been disclosed that has a plurality of image-taking means, and can be operated by a user to select the image-taking means. Some of these portable communication terminals require complicated operations for such display selection.

For overcoming the above problems, Japanese Patent Laying-Open No. 2001-169166, or the like has disclosed a portable communication terminal, which employs a touch panel for simplifying a required operation. This portable communication terminal includes a communication unit performing voice communication via a communication line, first and second image-taking lenses, a monitor unit with a touch panel, and a videophone unit.

According to the portable communication terminal disclosed in Japanese Patent Laying-Open No. 2001-169166, since the plurality of image-taking lenses can take pictures of subjects, a user can take pictures of the user himself/herself and another subject without changing the position of the portable communication terminal in his/her hand. Also, the user can select specific functions while referring to a menu displayed on the monitor unit with the touch panel. Further, the user can easily send pictures of a surrounding scene and another subject to the party on the other end of the communication line. Thereby, the portable communication terminal can provide an improved convenience to users.

However, according to the portable communication terminal disclosed in Japanese Patent Laying-Open No. 2001-169166, the user must operate the monitor unit with the touch panel to display a predetermined menu for selecting the specific function. During this operation by the user, therefore, the monitor unit cannot clearly display a picture of a subject taken by each lens or a picture received by the videophone unit in some cases. Consequently, the user may miss an opportunity to take a picture, or a speech communication with the party on the other end may be interrupted.

SUMMARY OF THE INVENTION

The invention has been developed for overcoming the above problems. An object of the invention is to provide a portable communication terminal, which allows switching of a displayed picture without missing an opportunity to take a picture and without interrupting a speech communication with the party on the other side.

In summary, for achieving the above object, a portable communication terminal according to an aspect of the invention includes a receiving unit receiving a video signal via a communication line; a plurality of image-taking units taking an image of a subject and producing a video signal displaying a picture of the subject; an instructing unit giving an instruction switching the displayed picture based on input of an instruction from a user; a producing unit producing, according to the instruction, a signal displaying a picture based on at least one of the signal among the video signals produced by the plurality of image-taking units, respectively, and the video signal received by the receiving unit; and a display unit displaying the picture based on the signal sent from the producing unit.

Preferably, the instructing unit includes an input unit receiving a switch instruction given by the user for switching the display of the picture, a measuring unit measuring an input time of input of the switch instruction, and a switch instructing unit giving the instruction based on the input time.

Preferably, the input unit includes a first holddown unit to be held down by the user for entering the switch instruction. The measuring unit measures a first holddown time of a held-down state of the first holddown unit held down by the user. The switch instructing unit includes a first display instructing unit giving the instruction based on the first holddown time.

Preferably, the first display instructing unit includes an output unit giving a first display instruction for the picture based on the video signal produced by the predetermined image-taking unit among the plurality of image-taking units when the first holddown time exceeds a predetermined time, and an instruction output unit giving a second display instruction for switching the displayed picture based on the respective signals produced by the plurality of image-taking units when the first holddown time is shorter than the predetermined time. The producing unit includes an output signal producing unit producing a signal based on the video signal produced by the predetermined image-taking unit based on the issue of the first display instruction, and a signal producing unit producing a signal based on the respective video signals produced by the plurality of image-taking units based on the issue of the second display instruction.

Preferably, the portable communication terminal further includes a storage unit storing a predetermined order of the switching; a plurality of information input units to be operated by the user for entering specific information specifying each of the plurality of image-taking units; and a determination unit for determining whether the specific information is input or not. The instruction output unit gives a first instruction for a picture based on the signal sent from the image-taking unit specified by the specific information when the specific information is input. The instruction output unit gives a second instruction for the picture based on the signal sent from the image-taking unit determined according to the switching order when the specific information is not input. When the first instruction is given, the signal producing unit produces the signal displaying the picture based on the video signal sent from the determined image-taking unit. When the second instruction is given, the signal producing unit produces the signal displaying the picture based on the video signal sent from the image-taking unit determined according to the switching order.

Preferably, the information input unit includes buttons for entering numbers.

Preferably, the input unit includes a second holddown unit to be held down by the user for entering the instruction. The measuring unit measures a second holddown time of a held-down state of the second holddown unit held down by the user. The switch instructing unit includes a second display instructing unit giving, based on the second holddown time, an instruction for displaying the plurality of pictures based on the respective video signals.

Preferably, the second display instructing unit includes an output unit giving a first display instruction for displaying a reduced picture based on the video signal received by the receiving unit when the second holddown time exceeds a predetermined time, and an instruction output unit giving a second display instruction for displaying a reduced picture based on the video signal produced by the predetermined image-taking unit among the plurality of image-taking units when the second holddown time is shorter than the predetermined time. The producing unit includes a first signal producing unit producing the video signal corresponding to a partial display region predetermined with respect to a display region of the display unit based on the video signal received by the receiving unit when the first display instruction is given, and a second signal producing unit producing the video signal corresponding to the partial display region based on the video signal produced by the predetermined image-taking unit when the second display instruction is given.

Preferably, the instruction output unit gives the second display instruction when the display unit is displaying the picture based on the video signal produced by the image-taking unit different from the predetermined image-taking unit.

Preferably, the first signal producing unit produces the video signal corresponding to the partial display region by compressing the video signal received by the receiving unit at a compression rate predetermined corresponding to the partial display region. The second signal producing unit produces the video signal corresponding to the partial display region by compressing the video signal produced by the predetermined image-taking unit at the compression rate.

Preferably, the first signal producing unit produces the video signal corresponding to the partial display region by selecting the video signal received by the receiving unit at predetermined intervals according to the partial display region. The second signal producing unit produces the video signal corresponding to the partial display region by selecting the video signal produced by the predetermined image-taking unit at the predetermined intervals.

Preferably, the instructing unit further includes a third holddown unit to be held down by the user for entering the switch instruction. The input unit measures a third holddown time of a held-down state of the third holddown unit held down by the user. The switch instructing unit includes a third display instructing unit giving the instruction based on the third holddown time.

Preferably, the third display instructing unit gives a switch instruction for switching the picture displayed in a display region of the display unit and the picture displayed in a partial display region predetermined with respect to the display region when the third holddown time exceeds a predetermined time. When the switch instruction is given, the producing unit produces the video signal corresponding to a data volume corresponding to the partial display region based on the video signal currently used for the display in the display region. When the switch instruction is given, the producing unit produces the video signal for the display in the display region based on the video signal currently used for the display in the partial display region.

Preferably, the portable communication terminal further includes a position data storage unit storing predetermined position data specifying a position of the partial display region in the display region. The third display instruction unit gives a change instruction changing the position of the partial display region in the display region when the third holddown time is shorter than the predetermined time. The producing unit produces, based on the issue of the change instruction, the video signal to be used for the display in the partial display region according to the position data.

Preferably, the instructing unit is arranged on the same surface as the display unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A-4 show a structure of a cellular phone according to a first embodiment of the invention.

FIG. 5 illustrates a data structure in the cellular phone of the first embodiment of the invention.

FIGS. 7A-7D show a change in picture displayed on a main monitor of the cellular phone according to the first embodiment of the invention.

FIG. 8 illustrates a data structure in a cellular phone according to a second embodiment of the invention.

FIGS. 11A-11E show a change in picture displayed on the main monitor of the cellular phone according to the second embodiment of the invention.

FIGS. 13A-13D show a change in picture displayed on the main monitor of the cellular phone according to the third embodiment of the invention.

DESCRIPTION OF THE PREFERRED EMBODIMENTS

Figure 2:
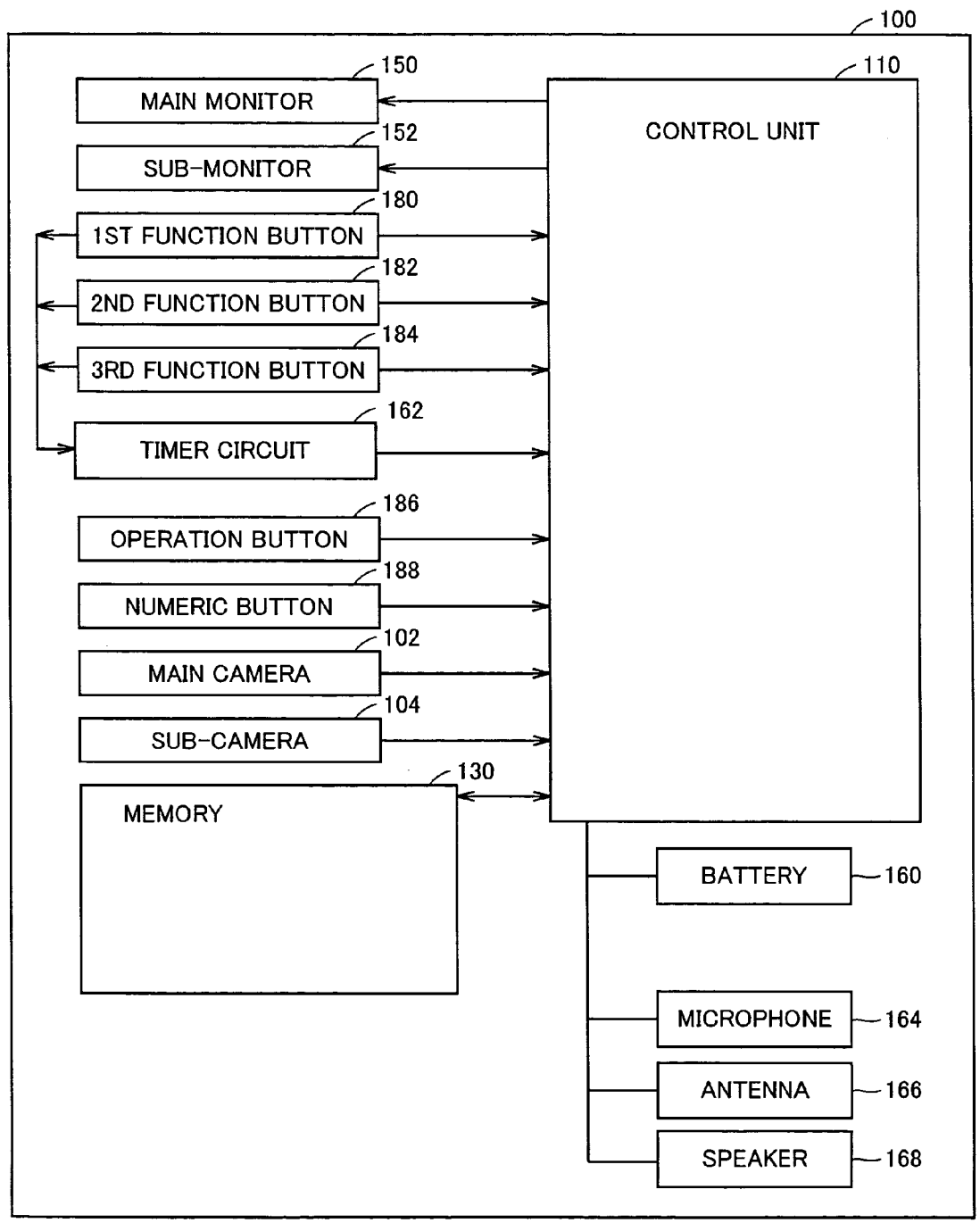

Embodiments of the invention are described with reference to the drawings. In the following description, the same parts and components bear the same reference numbers and the same names, and achieve the same functions. Therefore, description thereof is not repeated.

First Embodiment

Description is given on a portable communication terminal according to a first embodiment of the invention. The portable communication terminal is, e.g., a cellular phone, but may be another device having a communication function.

Referring to FIGS. 1A and 1B, a structure of a cellular phone 100 according to the first embodiment of the invention is described. FIG. 1A shows an outer appearance of cellular phone 100 viewed from a user side opposed to an operation surface. FIG. 1B shows the outer appearance of cellular phone 100 viewed from the rear side of the operation surface.

As shown in FIG. 1A, cellular phone 100 includes first and second bodies 120 and 122. First and second bodies 120 and 122 are connected together by a connection unit 124. First body 120 is equipped with a main monitor 150 and a sub-camera 104. Second body 122 is equipped at its operation surface with first, second and third function buttons 180, 182 and 184, a plurality of operation buttons 186 and numeric buttons 188.

Sub-camera 104 includes, e.g., a CCD (Charge Coupled Device). The plurality of operation buttons 186 include a movement button for moving a cursor on main monitor 150, a decision key for entering a determined instruction and other buttons. The plurality of operation buttons 186 are configured to send predetermined control signals when these are held down by the user, respectively, but may be configured to operate in another manner. For example, the plurality of operation buttons 186 may be a pointing device configured to freely change a position on main monitor 150 in accordance with input by the user.

Referring to FIG. 1B, a main camera 102 and a sub-monitor 152 are arranged on the rear surface of cellular phone 100, on which substantially no button is arranged for the user's operation. Main camera 102 includes, e.g., CCD similarly to sub-camera 104.

In this embodiment, the "main" and "sub-" are used for the sake of clear description, and the structure arranged in the specific position is not necessarily represented as the main structure.

Referring to FIG. 2, the structure of cellular phone 100 according to this embodiment is further described in detail. FIG. 2 is a block diagram illustrating a functional structure of cellular phone 100.

As shown in FIG. 2, cellular phone 100 includes, in addition to the structure shown in FIG. 1, a control unit 110, a memory 130, a battery 160, a timer circuit 162, a microphone 164, an antenna 166 and a speaker 168.

Control unit 110 send a video signal to either main monitor 150 or sub-monitor 152. A control signal sent from one of first, second and third function buttons 180, 182 and 184 is sent to control unit 110. Based on input of each of the control signals, a predetermined process is executed, as will be described later.

The plurality of operation buttons 186 include, e.g., a movement button for longitudinally and laterally moving a cursor in a display region on main monitor 150, and a confirmation button for confirming a process selected by the user. Signals sent from the plurality of operation buttons 186 are sent to control unit 110. Control unit 110 executes the predetermined process based on the input signal.

Numeric buttons 188 are used by the user for entering a telephone number for dialing and entering numbers corresponding to the respective buttons. The signal sent from numeric buttons 188 is sent to control unit 110. Control unit 110 dials the number determined according to the input signal, or executes predetermined processes according to the numeric value defined by the input signal. The processes will be described later.

A video signal of the subject taken by main camera 102 is sent to control unit 110. A video signal of the subject taken by sub-camera 104 is also sent to control unit 110. Further, a video signal received by antenna 166 is sent to control unit 110.

Control unit 110 selectively outputs the foregoing video signals to memory 130 based on predetermined conditions. Further, control unit 110 processes the video signal sent from main camera 102 or sub-camera 104 by thinning or compressing signal data corresponding to a partial region (which will be referred to as a "partial display region", hereinafter) in a display region of main monitor 150, and thereby sends a signal for displaying a picture in the partial display region to a work area of memory 130. In this case, the thinning or compression of the data is performed based on conditions such as preset thinning intervals or a preset compression rate. Main monitor 150 receives the signal thus sent, and thereby can display the picture taken by one of the cameras in the partial display region. Manners of thinning the data and compressing it are not restricted.

Memory 130 is a flash memory or the like, which allows writing of the data. Memory 130 stores programs for controlling operations of cellular phone 100 and data (e.g., telephone numbers of parties on the other ends, e-mail addresses and other information) entered by the user. The data stored in memory 130 will be described later.

Timer circuit 162 measures a time, for which one of first, second and third buttons 180, 182 and 184 is in a held-down position, and sends a signal representing the measured time to control unit 110. Base on this signal, control unit 110 determines whether the function button is held down for a time shorter than a predetermined time. This predetermined time may be freely set according to characteristics (e.g., operation characteristics of the respective function buttons, structural features and other characteristics) in cellular phone 100.

Figure 3:
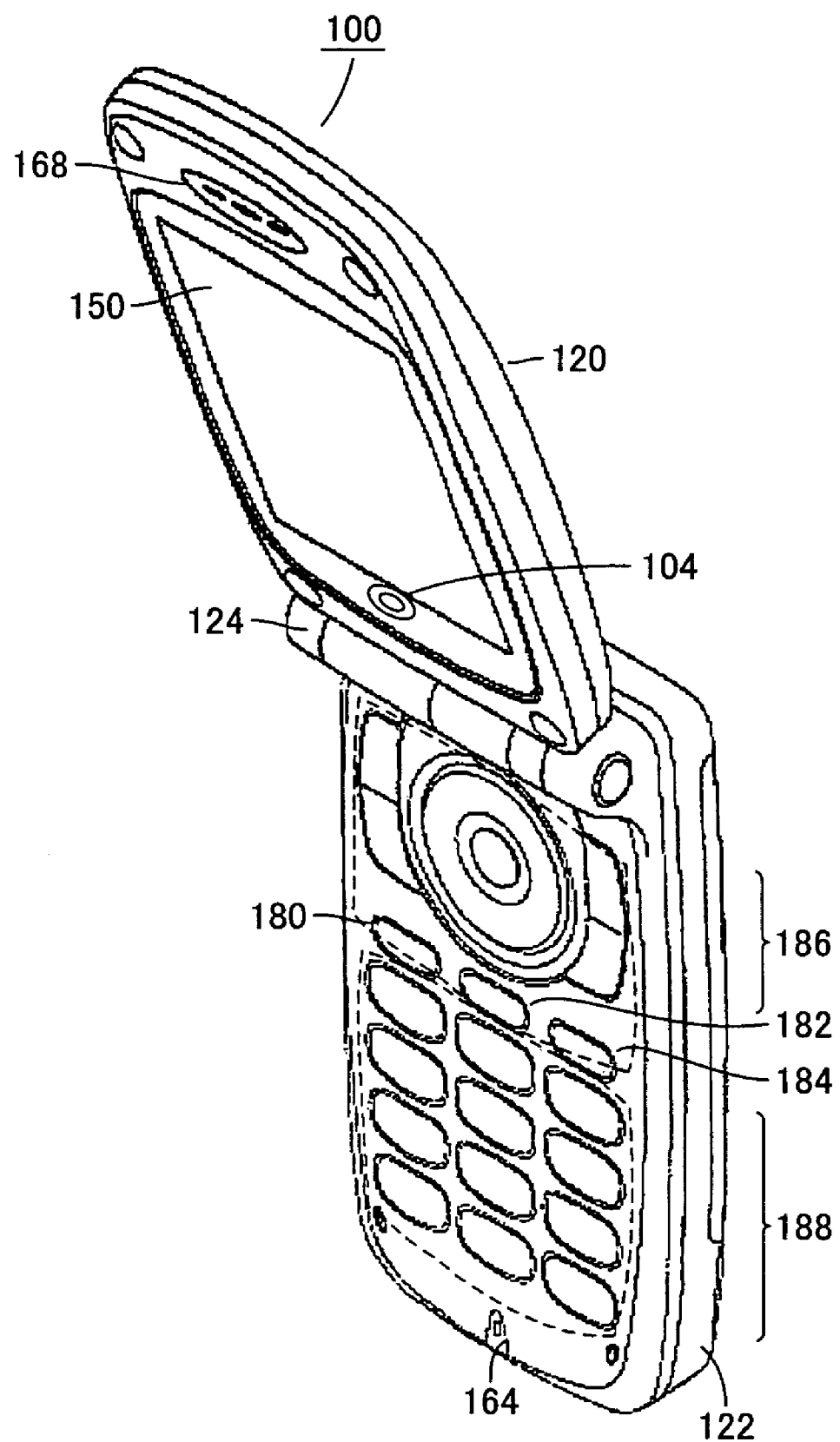
Figure 4:
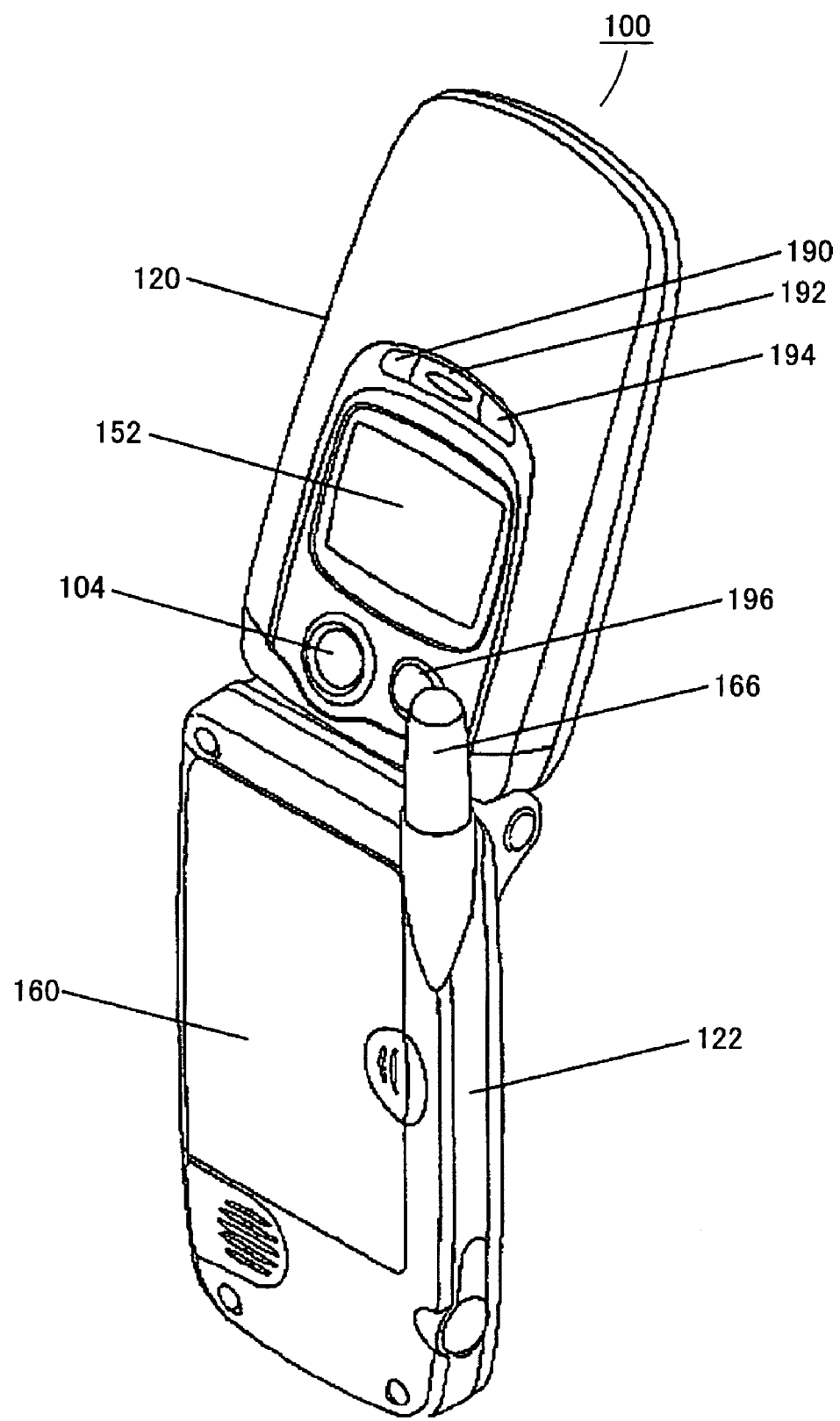

Referring to FIGS. 3 and 4, a form of cellular phone 100 according to this embodiment is described now. FIG. 3 shows an operation surface of cellular phone 100, which is formed of two bodies connected together in a foldable manner. FIG. 4 shows cellular phone 100 viewed from a rear side from the operation face.

Referring to FIG. 3, cellular phone 100 includes first and second bodies 120 and 122 connected together via connection unit 124. First body 120 is equipped with speaker 168 located above main monitor 150. Sub-camera 104 is arranged below main monitor 150. The arrangement of the various components in first body 120 is not restricted to that shown in FIG. 3. For example, sub-camera 104 may be arranged above main monitor 150 (e.g., beside speaker 168).

In second body 122, the plurality of operation buttons 186 are located near connection unit 124, and first, second and third function buttons 180, 182 and 184 are arranged between operation buttons 186 and numeric buttons 188 located near microphone 164. The arrangement of functions buttons 180, 182 and 184 is not restricted to that shown in FIG. 3. For example, function buttons 180, 182 and 184 may be arranged between the plurality of operation buttons 186 and connection unit 124. Thereby, the user can operate the function buttons more easily.

Referring to FIG. 4, first body 120 is equipped at its outer side with main camera 102, sub-monitor 152, operation buttons 190, 192 and 194, and light 196. Main camera 102 takes a picture of a subject, and sends a video signal according to operations of the plurality of operation buttons 186 or function buttons 180, 182 and 184 shown in FIG. 3. Light 196 is turned on to illuminate the subject in response to holddown of appropriate one among these operation buttons. It is not restrictive that light 196 is turned on in response to the holddown of the button. For example, such a manner may be employed that the light will turn on and keep its state in response to holddown of any one of the buttons, which is already selected by the user's preset. Also, the light may be configured to be turned on or to emit the light in response to the holddown of a shutter button (not shown).

Referring to FIG. 5, a data structure in cellular phone 100 according to the embodiment is described. FIG. 5 conceptually illustrates a part of data stored in memory 130 of cellular phone 100.

Data area D502 stores data representing a mode of cellular phone 100. Data area D504 stores data representing the function buttons corresponding to specific operations. Data area D506 stores times or spans allowing execution of the operations. Data area D508 stores data related to inputs required for allowing execution of the operations. Data area D510 stores contents of the functions, which are set based on the data stored in data areas D502-D508.

For example, data record R550 represents that the cameras in cellular phone 100 are set to operate successively in accordance with a predetermined order if first function button 180 is held down for a short time and other buttons are not pressed. If the above conditions are satisfied, main monitor 150 displays only the picture of the subject taken by one of the cameras in cellular phone 100.

The above short time is a time shorter than a predetermined time. This time can be freely set as one of general specifications of cellular phone 100. By setting such a time, different kinds of inputs can be effected by one button depending on the time. Consequently, it is possible to suppress increase in number of the buttons forming input means, and to add functions to the buttons.

Referring to FIG. 5 again, data record R560 represents that main monitor 150 displays a picture taken by sub-camera 104 if first function button 180 is held down for a short time, and the button "1" among numeric buttons 188 is held down.

Data record R570 represents that main monitor 150 displays a picture taken by a second sub-camera if first function button 180 is held down for a short time, and the button "2" among numeric buttons 188 is held down.

Data record R590 represents that main monitor 150 displays a picture of the subject taken by main camera 102 if first function button 180 is held down for a long time and other buttons are not pressed.

The manner of data storage in memory 130 is not restricted to the foregoing manner. For example, data area D502 may store data for a plurality of modes. Data area D504 may store data for a plurality of function buttons. Data which relates to the holddown time and is stored in data area D506 may not be the data for discrimination between a long holddown time and a short holddown time, and be data for classifying the holddown time more specifically.

Figure 6:
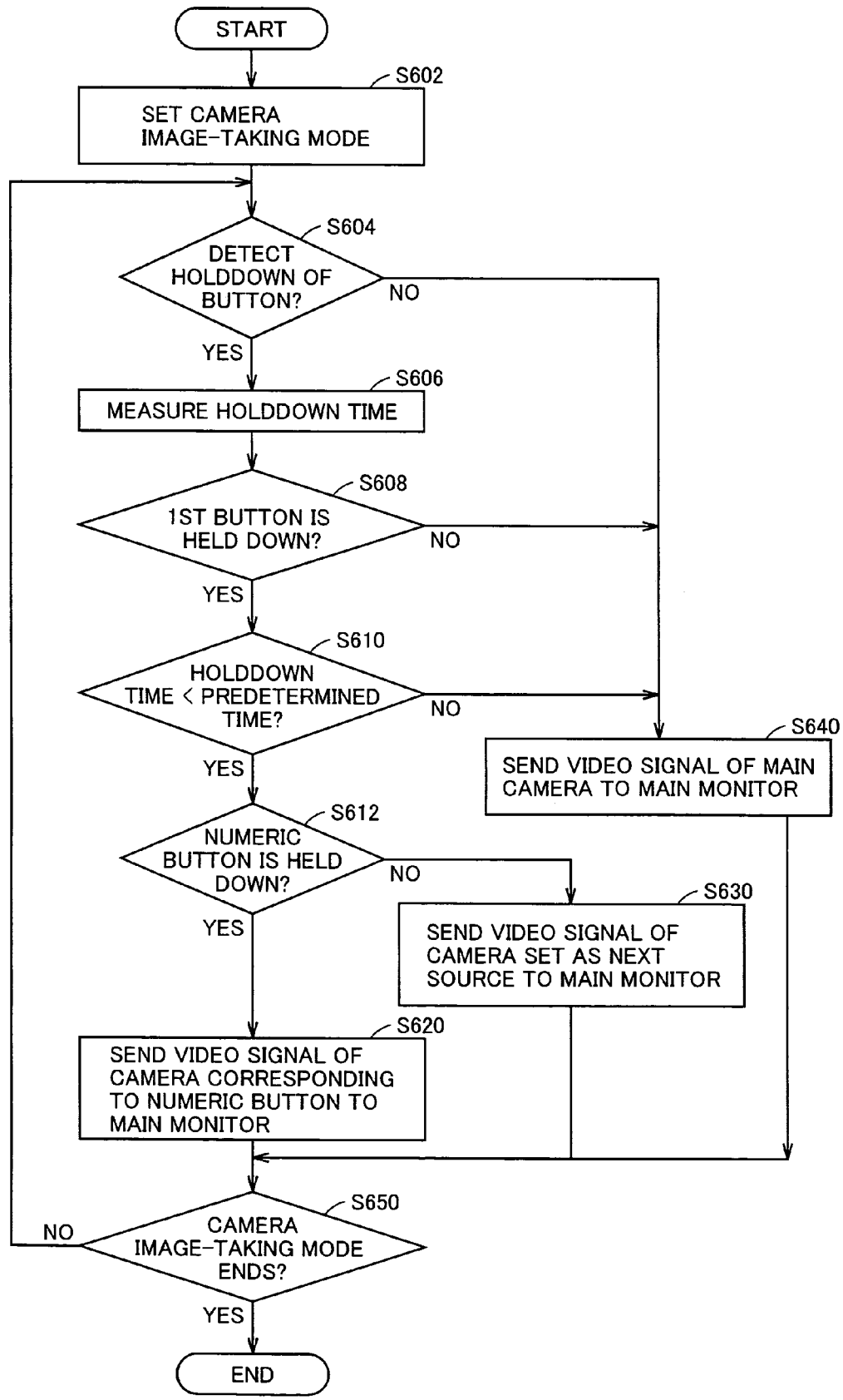
FIG. 6 is a flowchart illustrating a procedure of processing executed in the cellular phone according to the first embodiment of the invention.

Referring to FIG. 6, a control structure of cellular phone 100 according to this embodiment is described. FIG. 6 is a flowchart representing a procedure of processing executed by control unit 110 of cellular phone 100.

In step S602, control unit 110 of cellular phone 100 sets cellular phone 100 to a camera mode based on entry of a user's instruction. For example, when the user holds down the operation button, which is preset to attain the camera mode, cellular phone 100 enters the camera mode. Thereby, main camera 102 arranged in first body 120 attains a standby state. Main monitor 150 displays the picture of the subject taken by main camera 102.

In step S604, control unit 110 determines whether the buttons arranged on second body 122 are held down or not. This determination is performed by determining whether control unit 110 receives a signal from each button or not. When it is determined that the input button is held down (YES in step S604), a next process is performed in step S606. If not (NO in step S604), a next process is performed in step S640.

In step S606, control unit 110 measures a time, for which the button is in a held-down position. This measurement is performed based on data sent from a timer circuit (not shown) arranged inside control unit 110.

In step S608, control unit 110 determines whether first function button 180 is held down or not. This determination is performed by determining a source of the signal sent to control unit 110, and determining whether the source is first function button 180 or not. When it is determined that first function button 180 is held down (YES in step S608), a next process is performed in step S610. If not (NO in step S608), a next process is performed in step S640.

In step S610, control unit 110 determines whether the holddown time measured in step S606 is shorter than the predetermined time or not. If it is determined that the holddown time of first function button 180 is shorter than the predetermined time (YES in step S610), a next process is performed in step S612. If not (NO in step S610), a next process is performed in step S640.

In step S612, control unit 110 determines whether any one of numeric buttons 188 is held down or not. This determination is performed by determining a source of the signal sent to control unit 110, and determining whether the source is one of numeric buttons 188 or not. When it is determined that one of numeric buttons 188 is held down (YES in step S612), a next process is performed in step S620. If not (NO in step S612), a next process is performed in step S630.

In step S620, control unit 110 outputs a video signal, which is sent from the camera corresponding to the held-down numeric button, to main monitor 150. Main monitor 150 displays the picture of the subject taken by the camera.

In step S630, control unit 110 sent the video signal, which is sent from the camera selected according to the preset switch order, to main monitor 150. Thereby, in cellular phone 100 having the plurality of cameras, main monitor 150 changes the displayed pictures in response to the holddown of first function button 180.

In step S640, control unit 110 sent the video signal, which is sent from main camera 102, to main monitor 150. Thereby, main monitor 150 displays the picture of the subject, which is taken by main camera 102 according to the user's operation.

In step S650, control unit 110 determines whether the camera mode ends or not. This determination is performed based on whether control unit 110 receives a signal representing the ending of the camera mode. This signal is sent e.g., when the predetermined operation button is held down. When it is determined that the camera mode ends (YES in step S650), the process end. If not (NO in step S650), process is returned to step S604.

With reference to FIGS. 7A-7D, according to the structure and flowcharts already described, cellular phone 100 according to the embodiment operates as described below FIGS. 7A-7D show a change in picture displayed on main monitor 150 of cellular phone 100. In the following description, cellular phone 100 has main camera 102 and the first and second sub-cameras. However, the number of sub-cameras is not restricted to two. The cellular phone may have one sub-camera, or may have three or more sub-cameras.

When cellular phone 100 is in a standby state, main monitor 150 of cellular phone 100 displays an initial menu (FIG. 7A). If the user operates the button in a predetermined manner to set the camera mode (step S602), and then does not hold down another button (NO in step S604), main monitor 150 displays the picture of the subject taken by main camera 102 (step S640 in FIG. 7B).

If the user then holds down first function button 180 and keeps the held-down position for a short time (YES in steps S604, S608 and S610, and NO in step S612) while keeping cellular phone 100 in the camera mode (NO in step S650), main monitor 150 displays the picture based on data from sub-camera 104 (step S630, FIG. 7C). If cellular phone 100 has an additional sub-camera, main monitor 150 further switches the picture to that taken by the additional sub-camera when the user repeats the same operation (FIG. 7D).

Then, the user may likewise holds down first function button 180 while main monitor 150 is displaying the picture taken by the sub-camera, which is in the last position according to the display order. In this case, the displayed picture is changed to the picture of the subject taken by main camera 102 again (FIGS. 7D-7B).

According to cellular phone 100 of this embodiment, as described above, the user can operate first function button 180 to select and display the pictures taken by the plurality of cameras without displaying a menu for the camera operation. Thereby, the user can easily switch the display while constantly checking the picture displayed on main monitor 150. Since the menu or the like does not hide the picture displayed on main monitor 150, such a situation can be suppressed that the user misses an opportunity to take an intended picture.

Second Embodiment

A second embodiment of the invention is described. A cellular phone of the second embodiment differs from the cellular phone of the first embodiment in that the cellular phone of the second embodiment has a function of displaying a plurality of taken pictures on one monitor. The cellular phone of the second embodiment has the same hardware structure as cellular phone 100 of the first embodiment. Functions of the hardware structure of the second embodiment are the same as those of the first embodiment. Therefore, description thereof is not repeated.

Referring to FIG. 8, the data structure in cellular phone 100 of the second embodiment is described. FIG. 8 conceptually illustrates a structure of data stored in memory 130 of cellular phone 100.

Data area D802 stores data specifying the operation mode of cellular phone 100. Data area D804 stores data specifying the function buttons controlling the operations of cellular phone 100. Data area D806 stores holddown times of the function buttons for specifying the operations of the function buttons. Data area D808 stores information representing the functions set based on the data stored in data areas D802-D806.

Referring to FIG. 8, data record R850 represents, e.g., that main monitor 150 displays the picture taken by sub-camera 104. If main monitor 150 has already displayed the picture taken by main camera 102, the picture taken by sub-camera 104 is displayed in a fashion overlapping with the picture already displayed. Thus, the video signal, which displays the picture in the partial display region, is produced.

Data record R860 represents that main monitor 150 displays a picture produced by the videophone in addition to the picture already displayed. In this case, if main monitor 150 has already displayed the picture taken by main camera 102, the picture based on the video signal received by antenna 166 is superimposed on the picture taken by main camera 102. Thus, the video signal to be displayed in the partial display region is produced and sent to main monitor 150.

The data setting for controlling operations of cellular phone 100 is not restricted to that illustrated in FIG. 8.

Figure 9:
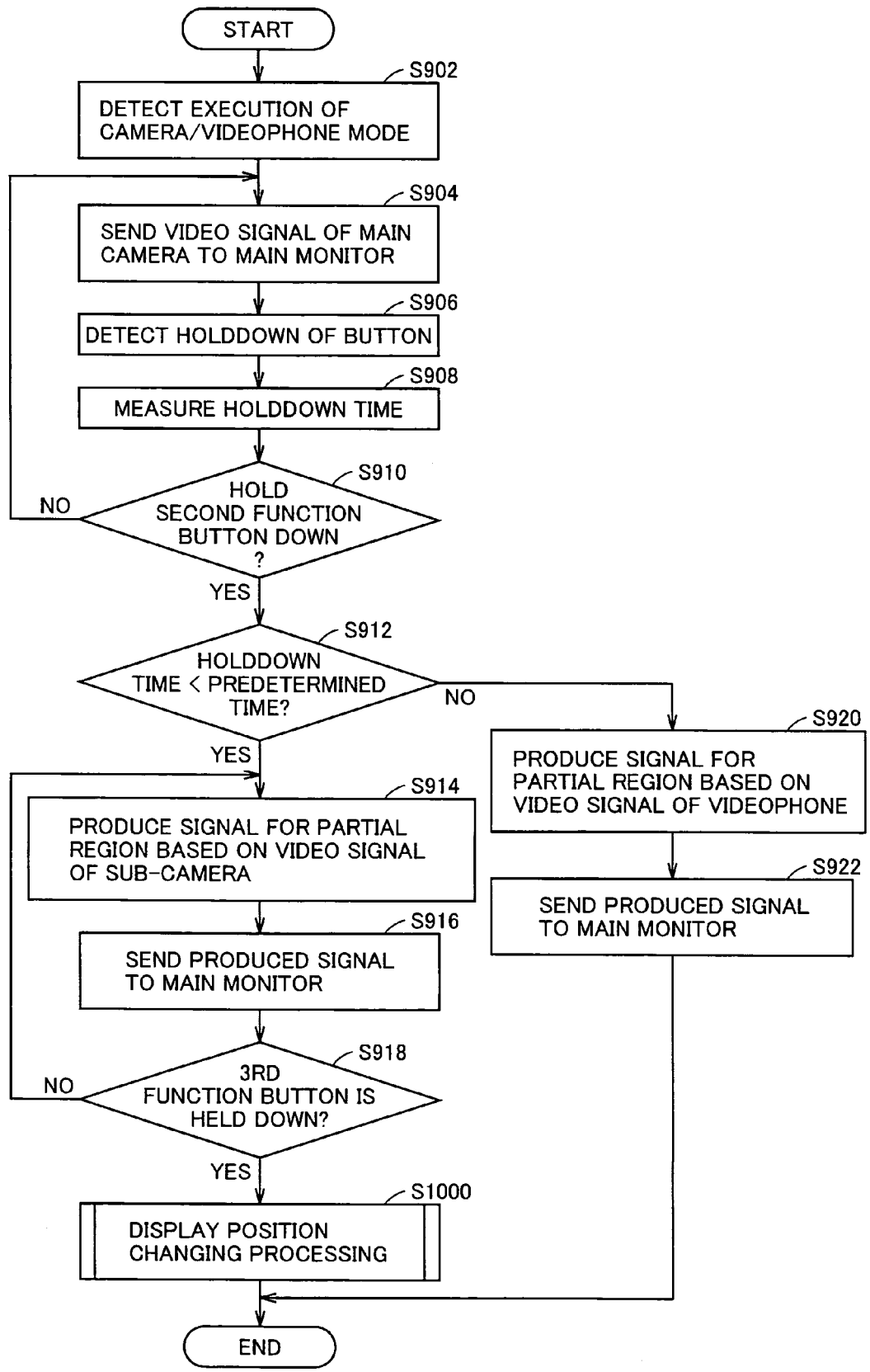
FIGS. 9 and 10 are flowcharts illustrating a procedure of processing executed in the cellular phone according to the second embodiment of the invention.

Referring to FIG. 9, description is given on a control structure of cellular phone 100 according to the embodiment. FIG. 9 is a flowchart illustrating a procedure of processing executed by control unit 110 of cellular phone 100.

In step S902, control unit 110 detects an entry in a camera/videophone mode based on the holddown of the operation button by the user. This detection is performed based on holddown/non-holddown of a button (not shown) for starting the videophone communication, e.g., during the standby state of main camera 102.

In step S904, control unit 110 sends the video signal, which represents the picture of the subject taken by main camera 102, to main monitor 150. Consequently, main monitor 150 displays the picture of the subject taken by main camera 102, and thus viewed by the user.

In step S906, control unit 110 detects the holddown of the button arranged on second body 122. In step S908, control unit 110 measures the holddown time of the button.

In step S 910, control unit 110 determines whether second function button 182 is held down or not. This determination is performed based on whether second function button 182 sends a signal to control unit 110 or not. When it is determined that second function button 182 is held down (YES in step S910), a next process is performed in step S912. If not (NO in step S910), processing is returned to step S904.

In step S912, control unit 110 determines whether the holddown time measured in step S908 is shorter than the predetermined time or not. When it is determined that the holddown time is shorter than the predetermined time (YES in step S912), a next process is performed in step S914. If not (NO in step S912), a next process is performed in step S920.

In step S914, control unit 110 produces a signal for displaying a picture on a part of main monitor 150 based on the video signal sent from sub-camera 104. This signal is produced by compressing the video signal sent from sub-camera 104 or by thinning it at specific intervals.

In step S916, control unit 110 sends the data thus produced to main monitor 150. Consequently, main monitor 150 displays the picture of the subject taken by sub-camera 104 in addition to the picture of the subject taken by main camera 102.

In step S918, control unit 110 determines whether third function button 184 is held down or not. This determination is performed, e.g., based on whether the signal sent from third function button 184 is sent to control unit 110 or not. When it is determined that third function button 184 is held down (YES in step S918), a next process is performed in step S1000. If not (NO in step S918), processing is returned to step S914.

In step S920, control unit 110 produces data for displaying the picture partially in the display region based on the video signal received via antenna 166 as a result of execution of the videophone function. This signal is produced in the same manner as the signal production in other steps.

In step S922, control unit 110 sends the data thus produced to main monitor 150. Consequently, main monitor 150 can display the picture of the party on the other end transmitted via a communication line in addition to the picture of the subject taken by main camera 102.

In step S1000, control unit 110 executes a display position changing process, which will be described later. When this process is executed, main monitor 150 can change the position of the partial display region, or can change places of the pictures between the whole display region (main display region) and the partial display region.

Figure 10:
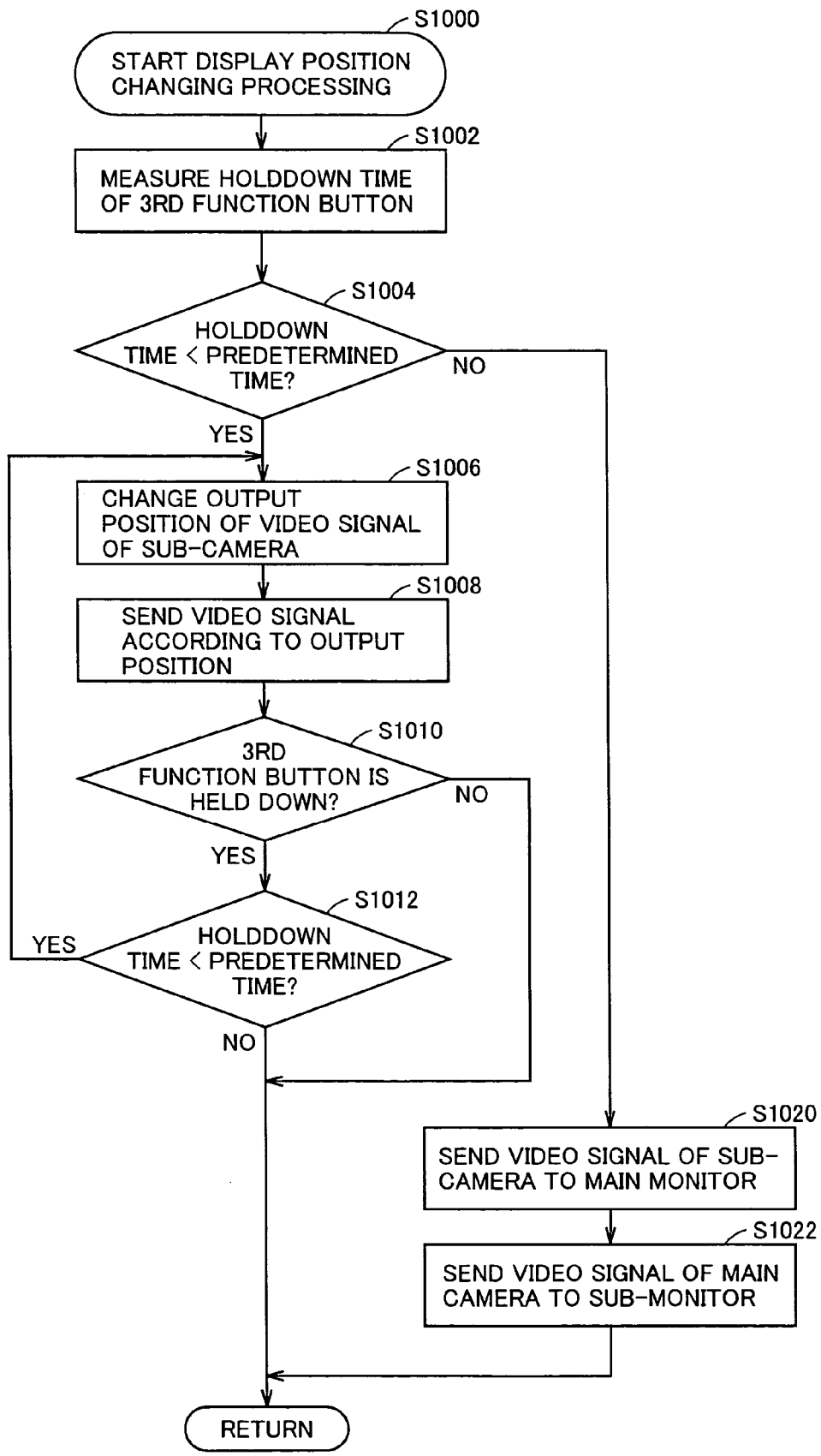

Referring to FIG. 10, the control structure of cellular phone 100 according to this embodiment is described. FIG. 10 is a flowchart illustrating a procedure of the display position changing process executed by control unit 110.

In step S1002, control unit 110 measures the holddown time of third function button 184.

In step S1004, control unit 110 determines whether the holddown time is shorter than a predetermined time or not. If the holddown time is shorter than the predetermined time (YES in step S1004), a next process is performed in step S1006. If not (NO in step S1004), a next process is performed in step S1020.

In step S1006, control unit 110 changes the output position of the video signal for displaying the picture taken by sub-camera 104. This change of the output position is performed based on the predetermined position data. For example, a plurality of video signal output positions are stored in advance, and the position data to be output is selected according to the holddown of third function button 184. From the video signal sent from sub-camera 104, such a video signal for display is produced that the picture may be displayed in a different display region on main monitor 150 according to the position data.

In step S1008, control unit 110 sends the video signal thus produced on main monitor 150.

In step S1010, control unit 110 determines whether third function button 184 is further held down or not. This determination is performed based on whether third function button 184 sends a signal to control unit 110 or not. When it is determined that third function button 184 is held down (YES in step S1010), a next process is performed in step S1012. If not (NO in step S1010), processing ends, and the main processing starts.

In step S1020, control unit 110 sends the video signal of the subject taken by sub-camera 104 according to the size of the display region in main monitor 150. In step S1022, control unit 110 produces and outputs the data for the partial display region based on the video signal of the subject taken by main camera 102. Consequently, main monitor 150 displays the picture of the subject taken by sub-camera 104 in the whole display region, and displays the picture of the subject taken by main camera 102 in a portion of the region. Thus, the manner of displaying the pictures changes from the initial manner.

With reference to FIGS. 11A-11D based on the structure and flowchart described above, cellular phone 100 according to this embodiment operates, as described below. FIGS. 11A-11D illustrate a change in display on main monitor 150 of cellular phone 100.

When cellular phone 100 is in the camera videophone mode (step S902), main monitor 150 of cellular phone 100 displays the picture of the subject taken by main camera 102 (step S904, FIG. 11A). If the user holds down second function button 182 (YES in step S910) and keeps the held-down position for a short holddown time (YES in step S912), main monitor 150 displays the picture of the subject taken by sub-camera 104 in addition to the picture taken by main camera 102 (step S916, FIG. 11B). If the user holds down third function button 184 (YES in step S918) and the holddown time shorter than the predetermined time (YES in step S1004), main monitor 150 displays the picture taken by sub-camera 104 in another preset position (step S1008, FIG. 11C). If the holddown time is longer than the predetermined time (NO in step S1004), main monitor 150 displays the picture taken by sub-camera 104 in the whole display region, and displays the picture taken by main camera 102 in the partial region (steps S1020 and S1022, FIG. 11E).

When the user holds down third function button 184 for a long time (NO in step S1004), main monitor 150 displays the picture taken by sub-camera 104 in the whole display region, and displays the picture taken by main camera 102 in the partial region (FIG. 1D).

[Display Operation of Videophone Pictures]

When the user holds down second function button 182 for a long time (NO in step S912) while cellular phone 100 is displaying the picture of the subject taken by main camera 102 on main monitor 150 (step S904), main monitor 150 displays the picture, which is based on the videophone function and is received via the communication line, in the partial region in addition to the display of the picture taken by main camera 102 (step S922, FIG. 11B).

According to cellular phone 100 of this embodiment, as described above, the user can hold down second function button 182 to display the additional picture in the partial region within the display region on main monitor 150. The picture in the partial region is switched based on the holddown time of second function button 182. Therefore, the user can display the picture, which is taken by either sub-camera 104 or the videophone, in the partial region without displaying the menu for such switching on main monitor 150.

Further, by holding down third function button 184, the user can change the position of the partial display region on main monitor 150, and can switch places of the pictures between the whole display region and the partial display region. Thereby, the display of the picture can be switched without hiding the displayed picture on main monitor 150. Therefore, cellular phone 100 can be used without wasting a communication time.

Third Embodiment

A third embodiment of the invention is described. A cellular phone according to the third embodiment differs from those of the foregoing embodiments in that the display region on main monitor 150 has a plurality of partial regions each having a function of displaying a picture.

The cellular phone of this embodiment has the same hardware structure as that of the first embodiment. Functions of the hardware structure of the third embodiment are the same as those of the first embodiment. Therefore, description thereof is not repeated.

Figure 12:
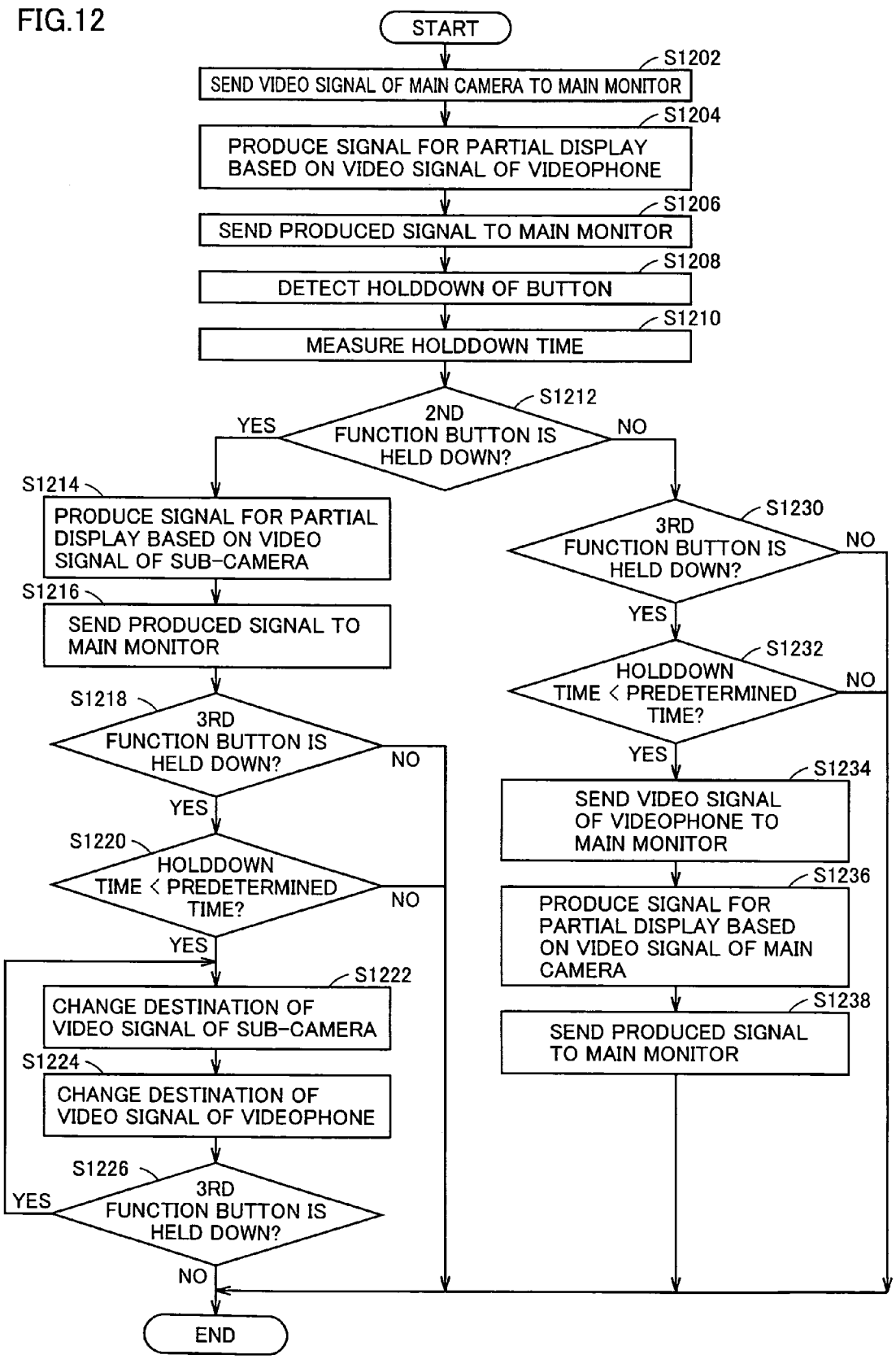
FIG. 12 is a flowchart illustrating a procedure of processing executed in the cellular phone according to a third embodiment of the invention.

Referring to FIG. 12, the control structure of cellular phone 100 according to this embodiment is described. FIG. 12 is a flowchart illustrating a procedure of processes executed by control unit 110 of cellular phone 100.

In step S1202, control unit 110 sends the video signal of the subject produced by main camera 102 to main monitor 150.

In step S1204, control unit 110 sends a signal for the partial display region of main monitor 150 from the video signal received according to the videophone function via the communication line. This signal is produced by thinning the input video signal according to the partial display region, or by compressing the input video signal at a compression rate predetermined based on the sizes of the whole display region and the partial display region.

In step S1206, control unit 110 sends the signal thus produced to main monitor 150. Consequently, main monitor 150 displays the picture of the videophone (i.e., the picture based on the video signal received by antenna 166 via the communication line) in addition to the picture of the subject taken by main camera 102.

In step S1208, control unit 110 detects the holddown of the button. In step S1210, control unit 110 measures a time, for which the button is in the held-down position.

In step S1212, control unit 110 determines whether second function button 182 is held down or not. This determination is performed, e.g., based on whether control unit 110 receives the signal sent from second function button 182 or not. When it is determined that second function button 182 is held down (YES in step S1212), a next process is performed in step S1214. If not (NO in step S1212), a next process is performed in step S1230.

In step S1214, control unit 110 produces a signal for the partial display region of main monitor 150 based on the video signal sent from sub-camera 104. This signal is produced, e.g., by thinning the video signal based on a signal amount corresponding to the partial display region, or by compressing it at a preset compression rate. In step S1216, control unit 110 sends the signal thus produced to main monitor 150.

In step S1218, control unit 110 determines whether third function button 184 is held down or not. This determination is performed based on whether third function button 184 sends the signal representing the holddown to control unit 110. When it is determined that third function button 184 is held down (YES in step S1218), a next process is performed in step S1220. If not (NO in step S1218), the processing ends.

In step S1220, control unit 110 determines whether the holddown time of third function button 184 is shorter than a predetermined time or not. If it is determined that the holddown time is shorter than a predetermined time (YES in step S1220), a next process is performed in step S1222. If not (NO in step S1220), the processing ends.

In step S1222, control unit 110 changes the destination of the video signal sent from sub-camera 104. This change is performed, e.g., by writing the video signal sent from sub-camera 104 in a work area of memory 130 according to the changed position of the partial display region.

In step S1224, control unit 110 changes the destination of the video signal produced by the videophone. This change is performed, e.g., by writing the signal in the work area of memory 130 according to a region, which is designated as the destination of the video signal sent from sub-camera 104.

In step S1226, control unit 110 determines whether third function button 184 is further held down or not. This determination is performed based on, e.g., whether control unit 110 receives the signal representing the holddown from third function button 184 or not. If third function button 184 is held down (YES in step S1226), the processing is returned to step S1222. If not (NO in step S1226), the processing ends.

In step S1230, control unit 110 determines whether third function button 184 is held down or not. When it is determined that third function button 184 is held down (YES in step S1230), a next process is performed in step S1232. If not (NO in step S1230), the processing ends.

In step S1232, control unit 110 determines whether the holddown time of third function button 184 is shorter than a predetermined time or not. If the holddown time is shorter than the predetermined time (YES in step S1232), a next process is performed in step S1234. If not (NO in step S1232), the processing ends.

In step S1234, control unit 110 sends the video signal produced by the videophone to main monitor 150. In step S1236, control unit 110 produces the signal for the partial display region based on the video signal sent from main camera 102. This signal is produced, e.g., by thinning the video signal at predetermined intervals according to the signal amount required for the partial display region, or by compressing the video signal at a preset compression rate.

In step S1238, control unit 110 sends the signal thus produced to main monitor 150. Thereby, main monitor 150 changes the initial manner of the picture display to another manner. Thus, the picture produced by the videophone is displayed in the whole display region on main monitor 150. The picture of the subject taken by main camera 102 is displayed in a part of the region.

With reference to FIGS. 13A-13D, according to the structure and flowcharts already described, cellular phone 100 of this embodiment operates, as will be described below. FIGS. 13A-13D show a change in displayed pictures on main monitor 150 of cellular phone 100 according to the embodiment.

When the user holds down second function button 182 (YES in step S1212) while cellular phone 100 is displaying a picture of the subject taken by main camera 102 and a picture of the videophone (step S1206, FIG. 13A), main monitor 150 displays the picture of the subject taken by sub-camera 104 on main monitor 150 (step S1216, FIG. 13B).

When the user holds down third function button 184 for a long time (YES in step S1220), the display of the videophone picture and the display of the picture taken by sub-camera 104 change in a predetermined direction (steps S1222 and S1224, FIG. 13C). When the user holds down third function button 184 (YES in step S1230) while cellular phone 100 is displaying the picture taken by main camera 102 and the picture of the videophone (step S1206), main monitor 150 switches the display positions of the videophone picture and the picture taken by main camera 102 (steps S1234 and S1238, FIG. 13D).

According to cellular phone 100 of the embodiment, as described above, the user can change the display on main monitor 150 without displaying a menu for changing the displayed picture on main monitor 150. Thereby, the user can partially display the picture at an appropriate position in the display region on main monitor 150 while checking a shooting status.

In addition to the structures of the foregoing embodiments, cellular phone 100 may have a structure, e.g., for displaying functions, which can be executed with active function buttons, in a part (i.e., a bottom row) of the display region on main monitor 150. Thereby, the user can operate the function buttons while referring to such display. Also, such display does not entirely use the display region, and therefore does not hide the displayed picture to a larger extent. As a result erroneous operations of the function buttons can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable communication terminal comprising:
a receiving unit receiving a video signal via a communication line;
a plurality of image-taking units taking an image of a subject and producing a video signal displaying a picture of said subject;
an instructing unit giving an instruction switching the displayed picture based on input of an instruction from a user;
a producing unit producing, according to said instruction, a signal displaying a picture based on at least one of the signal among said video signals produced by said plurality of image-taking units, respectively, and the video signal received by said receiving unit; and
a display unit displaying the picture based on the signal sent from said producing unit, wherein the instructing unit includes
an input unit receiving a switch instruction given by the user for switching the display of the picture,
first and second hold-down units to be held down by the user for entering said switch instruction,
a measuring unit measuring an input time of input of said switch instruction, and
a switch instructing unit giving said instruction based on said input time;
and wherein said measuring unit measures a first holddown time of a held-down state of said first holddown unit and a second holddown time of a held-down state of said second holddown unit, and
said switch instructing unit includes first and second display instructing units, the first display instructing unit giving said switching instruction based on said first holddown time, said second display instructing unit giving, based on said second holddown time, an instruction that causes display of the plurality of pictures based on said respective video signals.

2. The portable communication terminal according to claim 1, wherein
said first display instructing unit includes:
an output unit giving a first display instruction for the picture based on the video signal produced by the predetermined image-taking unit among said plurality of image-taking units when said first holddown time exceeds a predetermined time, and
an instruction output unit giving a second display instruction for switching the displayed picture based on the respective signals produced by said plurality of image-taking units when said first holddown time is shorter than said predetermined time; and
said producing unit includes:
an output signal producing unit producing a signal based on the video signal produced by said predetermined image-taking unit based on the issue of said first display instruction, and
a signal producing unit producing a signal based on the respective video signals produced by said plurality of image-taking units based on the issue of said second display instruction.

3. The portable communication terminal according to claim 2, further comprising:
a storage unit storing a predetermined order of the switching;
a plurality of information input units to be operated by the user for entering specific information specifying each of said plurality of image-taking units; and
a determination unit for determining whether said specific information is input or not, wherein
said instruction output unit operates:
to give a first instruction for a picture based on the signal sent from the image-taking unit specified by said specific information when said specific information is input, and
to give a second instruction for the picture based on the signal output from the image-taking unit determined according to said switching order when said specific information is not input; and
said signal producing unit operates:
to produce the signal displaying said picture based on the video signal sent from said determined image-taking unit when said first instruction is given, and
to produce the signal displaying said picture based on the video signal sent from the image-taking unit determined according to said switching order when said second instruction is given.

4. The portable communication terminal according to claim 3, wherein
said information input unit includes buttons for entering numbers.

5. The portable communication terminal according to claim 4, wherein
at least one of the buttons for entering numbers corresponds to one of the plurality of image-taking units, and
when the input unit receives said switch instruction at the same time said at least one button is operated by the user, the displayed picture is based on the video signal produced by the image-taking unit corresponding to the at least one button.

6. The portable communication terminal according to claim 1, wherein
said second display instructing unit includes:
an output unit giving a first display instruction for displaying a reduced picture based on the video signal received by said receiving unit when said second holddown time exceeds a predetermined time, and
an instruction output unit giving a second display instruction for displaying a reduced picture based on the video signal produced by the predetermined image-taking unit among said plurality of image-taking units when said second holddown time is shorter than said predetermined time; and
said producing unit includes:
a first signal producing unit producing the video signal corresponding to a partial display region predetermined with respect to a display region of said display unit based on the video signal received by said receiving unit when said first display instruction is given, and
a second signal producing unit producing the video signal corresponding to said partial display region based on the video signal produced by said predetermined image-taking unit when said second display instruction is given.

7. The portable communication terminal according to claim 6, wherein
said instruction output unit gives said second display instruction when said display unit is displaying the picture based on the video signal produced by the image-taking unit different from said predetermined image-taking unit.

8. The portable communication terminal according to claim 6, wherein
said first signal producing unit produces the video signal corresponding to said partial display region by compressing the video signal received by said receiving unit at a compression rate predetermined corresponding to said partial display region, and
said second signal producing unit produces the video signal corresponding to said partial display region by compressing the video signal produced by said predetermined image-taking unit at said compression rate.

9. The portable communication terminal according to claim 6, wherein
said first signal producing unit produces the video signal corresponding to said partial display region by selecting the video signal received by said receiving unit at predetermined intervals according to said partial display region, and
said second signal producing unit produces the video signal corresponding to said partial display region by selecting the video signal produced by said predetermined image-taking unit at said predetermined intervals.

10. The portable communication terminal according to claim 1, wherein
said instructing unit further includes a third holddown unit to be held down by the user for entering said switch instruction,
said input unit measures a third holddown time of a held-down state of said third holddown unit held down by the user, and
said switch instructing unit includes a third display instructing unit giving said switching instruction based on said third holddown time.

11. The portable communication terminal according to claim 10, wherein said third display instructing unit gives a switch instruction for switching the picture displayed in a display region of said display unit and the picture displayed in a partial display region predetermined with respect to said display region when said third holddown time exceeds a predetermined time; and said producing unit operates:

to produce the video signal corresponding to a data volume corresponding to said partial display region based on the video signal currently used for the display in said display region, when said switch instruction is given, and to produce the video signal for the display in said display region based on the video signal currently used for the display in said partial display region, when said switch instruction is given.

12. The portable communication terminal according to claim 10, further comprising:

a position data storage unit storing predetermined position data specifying a position of said partial display region in said display region, wherein said third display instruction unit gives a change instruction changing the position of said partial display region in said display region when said third holddown time is shorter than said predetermined time, and said producing unit produces, based on the issue of said change instruction, the video signal to be used for the display in said partial display region according to the position data.

13. The portable communication terminal according to claim 1, wherein said instructing unit is arranged on the same surface as said display unit.

* * * * *